US006807522B1

(12) United States Patent
Orfali

(10) Patent No.: US 6,807,522 B1
(45) Date of Patent: Oct. 19, 2004

(54) METHODS FOR PREDICTING INSTRUCTION EXECUTION EFFICIENCY IN A PROPOSED COMPUTER SYSTEM

(75) Inventor: Marwan A. Orfali, Woodbury, MN (US)

(73) Assignee: Unisys Corporation, Blue Bell, PA (US)

( * ) Notice: Subject to any disclaimer, the term of this patent is extended or adjusted under 35 U.S.C. 154(b) by 792 days.

(21) Appl. No.: 09/790,627

(22) Filed: Feb. 16, 2001

(51) Int. Cl.[7] .............................. G06F 9/45; G06F 7/48; G06F 9/46
(52) U.S. Cl. ............................ 703/22; 703/2; 709/224; 718/105
(58) Field of Search ............................. 703/2, 21, 22, 703/25; 709/201, 224; 711/170; 717/128; 718/105

(56) References Cited

U.S. PATENT DOCUMENTS

| 5,088,058 | A | | 2/1992 | Salsburg | ....................... 703/25 |
| 5,452,440 | A | | 9/1995 | Salsburg | ...................... 711/136 |
| 5,586,303 | A | | 12/1996 | Willenz et al. | ............. 711/172 |
| 5,615,357 | A | | 3/1997 | Ball | ............................ 703/21 |
| 5,815,688 | A | | 9/1998 | Averill | ....................... 361/680 |
| 5,845,106 | A | | 12/1998 | Stapleton | ..................... 703/21 |
| 5,894,575 | A | | 4/1999 | Levine et al. | ............... 717/128 |
| 6,477,683 | B1 | * | 11/2002 | Killian et al. | .................. 716/1 |
| 6,651,153 | B1 | * | 11/2003 | Orfali | ......................... 711/170 |
| 6,697,968 | B1 | * | 2/2004 | Orfali | .......................... 714/45 |

OTHER PUBLICATIONS

Hossain et al., A.Z.M.E. End–System Archintecture for Distributed Networked Multimedia Applications: Issues, Trends and Future Directions, 1999 IEEE Pacific Rim Conference on Communications, Computers and Signal Processing, Aug. 1999, pp. 452–455.*
Rosner et al., R. Filtering Techniques to Improve Trace-Cache Efficiency, 2001 International Conference on Parallel Architectures and Compilation Techniques, IEEE, Sep. 2001, pp. 37–48.*
Bohm et al., A.P.W. Code Optimization for Tagged–Token Dataflow Machines, IEEE Transactions on Computers, vol. 38, Iss. Jan. 1, 1989, pp. 4–14.*
Gao et al., G.R. Parallel Function Invocation in a Dynamic Argument–Fetching Dataflow Architecture, International Conference on Databases, Parallel Architectures and Their Applications, Mar. 1990, pp. 112–116.*
U.S. patent application Ser. No. 09/745,813, Orfali, filed Dec. 21, 2000.
U.S. patent application Ser. No. 09/747,046, Orfali, filed Dec. 21, 2000.

* cited by examiner

Primary Examiner—Russell Frejd
(74) Attorney, Agent, or Firm—Charles A. Johnson; Mark T. Starr; Crompton, Seager & Tufte LLC

(57) ABSTRACT

Methods and systems are provided for efficiently predicting the instruction execution efficiency of a proposed computer system. This is accomplished by first measuring or otherwise obtaining actual instruction execution efficiency values for two or more actual computer systems. The actual instruction execution efficiency values are preferably measured using a sufficient number of actual computer systems that have a sufficient variety of resource allocations to create a statistically significant pool of information or data. Using this pool of information or data, a predicted instruction execution efficiency value is calculated for a proposed computer system having a proposed allocation of resources of the first resource type and the second resource type. This is preferably accomplished by performing a multi-variant regression analysis of selected actual instruction execution efficiency values in the pool of information or data.

20 Claims, 6 Drawing Sheets

METHODS FOR PREDICTING INSTRUCTION EXECUTION EFFICIENCY IN A PROPOSED COMPUTER SYSTEM

CROSS-REFERENCE TO CO-PENDING APPLICATIONS

This application is related to co-pending U.S. patent application Ser. No. 09/784,933, filed Feb. 16, 2001, entitled "Methods for Predicting Cache Memory Performance in a Proposed Computer Systemn", U.S. patent application Ser. No. 09/747,050, filed Dec. 21, 2000, entitled "System and Method for High Speed, Low Cost Address and Bus Signal Tracing", U.S. patent application Ser. No. 09/745,813, filed, Dec. 21, 2000, entitled "High Speed Processor Interconnect Tracing Compaction Using Selectable Triggers", and U.S. patent application Ser. No. 09/747,046, filed Dec. 21, 2000, entitled "Coordination of Multiple Processor Bus Tracings for Enable Study of Multiprocessor Multi-Bus Computer Systems", all of which are incorporated herein by reference.

BACKGROUND OF THE INVENTION

1. Technical Field of the Invention

This invention relates generally to methods of predicting the instruction execution efficiency in a computer system, and more specifically, to methods of predicting the instruction execution efficiency in a proposed computer system having a proposed computer system architecture and configuration.

2. Description of the Prior Art

Modern computer systems can have a wide variety of computer architectures and configurations. To optimize efficiency, a computer system should have an architecture and configuration that is suitable for an expected load. If the architecture or configuration is excessive for a particular load, some of the computer resources will be wasted. If the architecture or configuration is not sufficiently robust for a particular load, the computer system will not provide adequate performance.

A high performance desktop computer designed for multi-media or graphical applications often have a standard PC architecture, with a relatively large amount of Random Access Memory (RAM), large hard drives, and one or more processors with fairly high clock rates. Multi-media and graphical applications are often computational and/or memory intensive, thereby requiring relatively large amounts of memory and processing capability. In contrast, a desktop computer system designed for office use may have a standard PC architecture, but will often have far less RAM, a smaller hard drive and a single processor with less performance. The reduced computer resources of office type systems is appropriate because of the fairly light load of many office applications such as word processing.

For more complex computer systems, such as on-line transaction processing systems, both the architecture and the configuration of the computer system are often designed to accommodate the expected load. The overall throughput of such systems is often dependent on a number of inter-related factors including, for example, the overall architecture of the computer system, the configuration of the computer resources with the architecture, and the expected load and load type.

The architecture of a computer system may include, for example, the location of cache memory, the number of cache memory levels, the location of main memory, the location of processors within the system, the internal bus structure, the I/O structure, as well as other architectural details. The configuration of computer resources within the architecture may include, for example, the size and speed of each level of cache memory, and the number and speed of the processors.

The expected load should be taken into account when designing a computer system, and in particular, when selecting an architecture and/or configuration for the computer system. During the development of a computer system, the developer typically has some idea of the expected load for the system. Often, the expected load for the computer system is estimated by examining the software that will be run on the system. To help design a robust computer system that can efficiently handle the expected loads, it is important for the developer to have some way of evaluating the performance of a proposed computer system based on the expected load, before the system is actually completely developed. This allows the developer to evaluate many different computer architectures and/or configurations before selecting a particular architecture and/or configuration for the particular application.

One measure of a computer system's performance is the computation time required to process a transaction. This can be derived from the computer system's minimum latency period and its queuing time, sometimes using an analytical model as described below. The queuing time can be computed from the resource utilization, which, in turn, can be computed from the computer system's speed in processing the transactions.

Two elements play a key role in determining how efficiently a computer system executes user queries. These include the amount of memory and the processing capability of the system. The amount of memory effects how many instructions are required to retrieve the information necessary to complete a transaction. If, for example, the amount of memory in the computer system is relatively large, the information necessary to complete a transaction is more likely to be present in memory, and therefore it is less likely that the operating system will have to generate and submit additional instructions to access a disk or the like via an I/O channel.

The number and speed of the processors in the computer system can also effect how fast and efficiently a computer system executes user queries. As more processors are added, the instructions necessary to complete a particular transaction are executed faster. However, adding more processors increases the load on the memory, which increases the chance that the requested information will not be in the memory. This can increase the chance that the operating system will have to generate and submit additional instructions to access a disk or the like via an I/O channel.

In addition, as more processors are added, more instruction cycles tend to be dedicated to overhead because of conflicts or other interactions between processors. For example, as more processors are added, more interrupts, dispatches, conflicts resulting in spin/lock loops, I/O locking conflicts, etc. are typically encountered, all of which reduce the efficiency of the computer system. Thus, there is an interplay between the amount of memory and the processing capability of a computer system that effects how fast and efficiently the computer system can execute user queries.

A primary way for a developer to evaluate and predict computer system performance is to develop computer performance models. Such models have traditionally been developed using either probabilistic evaluation (analytic models) or discrete event simulation programs (simulation models).

An analytic model is often defined to be a model that accepts moment estimators (such as mean arrival and service times) as its input and, using a closed form or iterative method, produces moment estimators for the desired statistics (such as average wait time). Analytic modeling has proven to be applicable in a wide range of computer system performance evaluation problems, and is the primary method used commercially today.

There are some fundamental drawbacks to analytic modeling. One drawback is that each analytical model is based on actual design specifications of a computer system. Thus, the computer system must already be sufficiently designed before any meaningful simulations can be performed. In addition, direct measurements have shown that many computer systems seriously violate the underlying assumptions of analytic models, and the actual distributions of the analytic modeling parameters must often be simplified; both tending to compromise the accuracy of the results. Finally, significant time and expense are required to develop an analytical model, which as indicated above, is typically designed for a particular computer system and configuration. To calculate the performance for another computer system or configuration, the analytical model must typically be redesigned to fit the characteristics of the new system. This can be a time consuming, tedious and expensive task.

Simulation models are primarily useful in studying computer performance at a high level of detail. A simulation model may be defined to be a model which accepts a set of measured or generated events (such as arrival or service requests) as its input and produces performance data corresponding thereto. Unfortunately, the processing requirements needed to run the simulations are related to the level of detail of such models. Because many of today's systems are very large and complex, detailed simulations are often impractical because of the inordinate amount of processing time required to produce performance data.

Statistical techniques have also been used to augment and assist conventional analytic and simulation approaches, and also to aid in their evaluation. For example, statistical techniques have been used to provide a sub-model portion of, for example, an overall cache memory simulation model. While such usage of statistical modeling offers the possibility of reducing the complexity and processor requirements of some simulation models, it often does not reduce the simulation times to desirable levels unless the sub-models are oversimplified, which results in reduced accuracy.

Performance projections for processors and memory subsystems are often critically dependent upon a correct understanding of the workloads which are imposed on such systems. In order to accurately predict the performance of a proposed system to assist in selecting among the various design tradeoffs, some prior art systems collect instruction streams (i.e., "traces") that statistically represent actual workloads. By using traces that represent a fixed workload as input to a system model that allows variations on some hardware parameters, such as the number of processors, some developers hope to predict performance for that workload versus number of processors.

A limitation of using representative trace data is that the traces can become very large, even for fairly simple instruction streams. A number of methods for minimizing the length of the trace data are disclosed in, for example, U.S. patent application Ser. No. 09/747,050, entitled "System and Method for High Speed, Low Cost Address and Bus Signal Tracing", U.S. patent application Ser. No. 09/745,813, entitled "High Speed Processor Interconnect Tracing Compaction Using Selectable Triggers", and U.S. patent application Ser. No. 09/747,046, entitled "Coordination of Multiple Processor Bus Tracings for Enable Study of Multiprocessor Multi-Bus Computer Systems", all of which are assigned to the assignee of the present invention and all of which are incorporated herein by reference. Even using these methods, however, the size of the trace data can become large, particularly for systems that have a relatively large number of processors and/or a relatively large cache memory.

SUMMARY OF THE INVENTION

The present invention overcomes many of the disadvantages of the prior art by providing methods and systems for efficiently predicting the instruction execution efficiency of a proposed computer system. This is preferably accomplished by first measuring or otherwise obtaining actual instruction execution efficiency values for two or more actual computer systems. Each of the actual instruction execution efficiency values may correspond to, for example, the number of instructions that are executed per unit of work, which can be derived from the number of instructions that are executed during a predetermined software code section or portion thereof.

Each of the actual computer systems preferably has a different allocation of resources, and in particular, a different allocation of resources of a first resource type and a second resource type. In one illustrative embodiment, the resources of the first resource type may correspond to memory (e.g., cache and/or main memory) and the resources of the second resource type may correspond to processing capability (e.g., number and/or speed of the processors). Each of the actual instruction execution efficiency values is preferably measured while executing a predetermined set of software codes, such as a TPC benchmark.

As noted above, two elements play a key role in determining how efficiently a computer system executes user queries. These include the amount of memory and the processing capability of the system. The amount of memory effects how many instructions are required to retrieve the information necessary to complete a transaction. If, for example, the amount of memory in the computer system is relatively large, the information necessary to complete a transaction is more likely to be present in memory, and therefore it is less likely that the operating system will have to generate and submit additional instructions to access an external hard disk or the like via an I/O channel.

The number and speed of the processors in the system can also effect how fast and efficiently a computer system executes user queries. As more processors are added, the instructions that are necessary to complete a particular transaction are executed faster. However, adding more processors increases the load on the memory, which increases the chance that the requested information will not be in the memory. This can increase the chance that the operating system will have to generate and submit additional instructions to access a disk or the like via an I/O channel.

Also, as more processors are added, more instruction cycles tend to be dedicated to overhead because of conflicts or other interactions between processors. For example, as more processors are added, more interrupts, dispatches, conflicts resulting in spin/lock loops, I/O locking conflicts, etc. are typically encountered, all of which reduce the efficiency of the computer system. Thus, there is an interplay between the amount of memory and the processing capability of a computer system that effects how fast and efficiently the computer system can execute user queries.

To assess this interplay, actual instruction execution efficiency values are preferably measured using a sufficient number of actual computer systems that have a sufficient variety of resource allocations to create a statistically significant pool of information or data. Using this pool of information or data, a predicted instruction execution efficiency value can be calculated for a proposed computer system having a proposed allocation of resources of the first resource type and the second resource type. This is preferably accomplished by performing a multi-variant regression analysis of selected actual instruction execution efficiency values in the pool of information or data The multi-variant regression analysis preferably identifies a first contribution or function for the first resource type and a second contribution or function for the second resource type. The first contribution or function and the second contribution or function can then be used in conjunction with the proposed resource allocation of the first resource type and the second resource type, respectively, to predict the instruction execution efficiency value of the proposed computer system.

Because the instruction execution efficiency value of a computer system is typically dependent on both the size of the memory and the load on the memory, it may be desirable to perform a data transformation on the memory size of the actual computer system before performing the multi-variant regression. One illustrative data transformation includes a memory load value divided by the memory size. The memory load value may be related to, for example, the number of transactions per minute produced by the actual computer system, the number and/or speed of the processors used in the actual computer system, or some other metric related to the processing capability of the actual computer system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
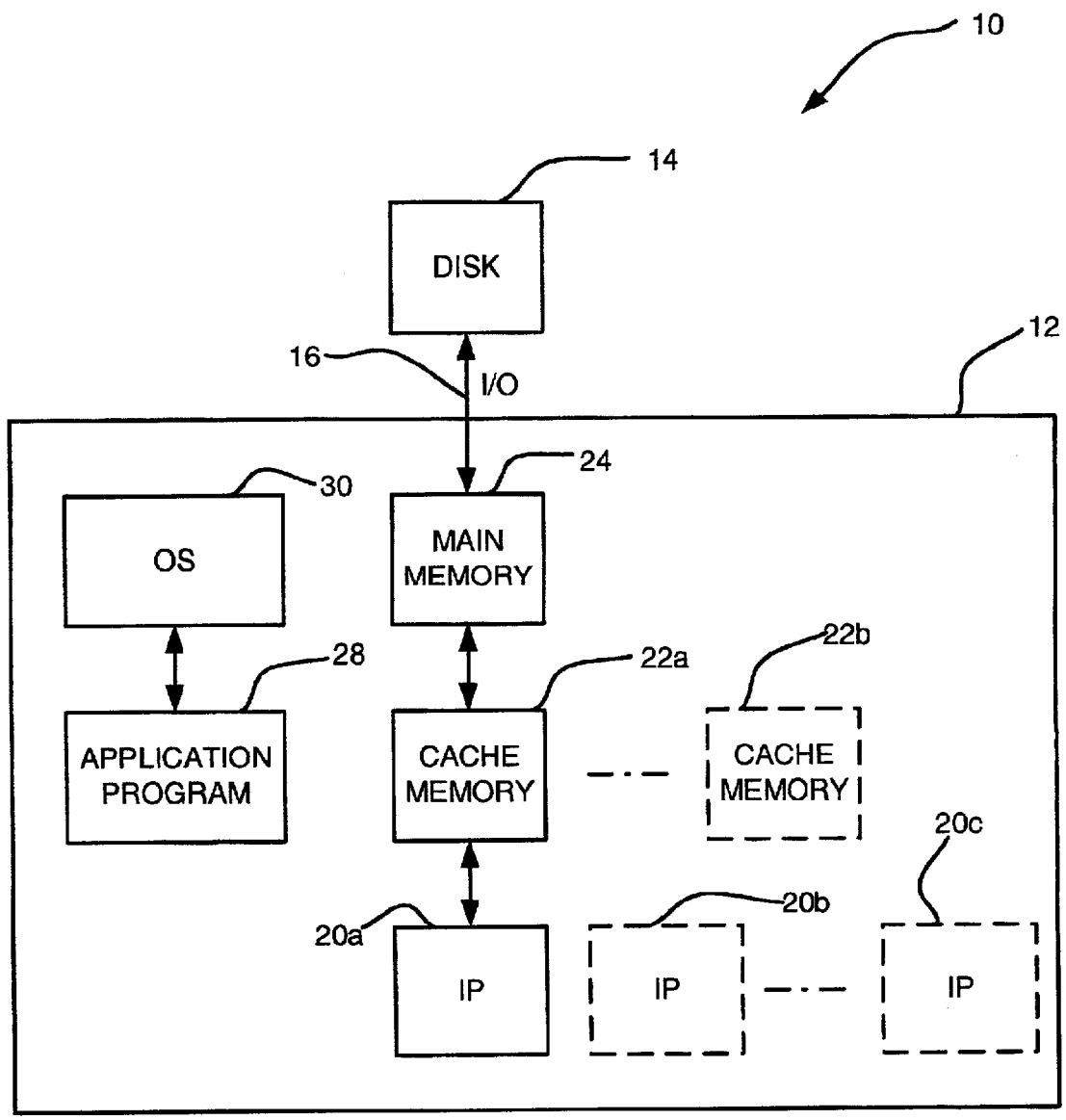
FIG. 1 is a high level schematic diagram of a typical computer system architecture.

FIG. 1 is a high level schematic diagram of a typical computer system. The illustrative computer system is generally shown at 10, and includes a processing module 12 and an external disk 14. The processing module 12 of FIG. 1 includes one or more instruction processors (IPs) 20a–20c, one or more cache memories 22a–22b and a main memory 24. Each cache memory 22a–22b services one or more of the instruction processors (IPs) 20a–20c, and the main memory 24 services one or more of the cache memories 22a–22b.

During operation, an instruction processor, such as IP 20a, may request a data element from a corresponding cache memory, such as cache memory 22a. If the cache memory 22a has the requested data element, the data element is passed to the requesting IP 20a. If the cache memory 22a does not have the requested data element, the cache memory 22a requests the data element from the main memory 24. If the main memory 24 has the requested data element, the data element is passed to the requesting cache memory 22a, and then to the requesting IP 20a. If the main memory 24 does not have the requested data element, the main memory 24 must request the data element from disk 14. Requesting data from disk 14 can take a relatively long time.

The functional operation of the processing module 12 is typically controlled by an application program 28. The application program 28 often must work in concert with an operating system 30. The operating system 30 typically is used to control or access certain hardware within the computer system 10. For example, the application program 28 typically does not have the capability to directly access disk 14. Instead, the application program 28 must request that the operating system 30 access disk 16.

Two elements play a key role in determining how efficiently a computer system 10 executes user queries. These include the amount of memory (e.g., cache memory 22a–22b and/or main memory 24) and the processing capability of the system. The amount of memory effects how many instructions are required to retrieve the information necessary to complete a transaction. If, for example, the amount of memory in the computer system is relatively large, the information necessary to complete a transaction is more likely to be present in memory, and therefore it is less likely that the operating system 30 will have to generate and submit additional instructions to access an external hard disk 14 or the like via I/O channel 16.

The number and speed of the processors 20a–20c in the system 10 can also effect how fast and efficiently the computer system executes user queries. As more processors are added, the instructions that are necessary to complete a particular transaction are executed faster. However, this increase in speed is offset by a couple of factors. First, adding more processors increases the load on the memory, which increases the chance that the requested information will not be in the memory. As noted above, this can increase the chance that the operating system 30 will have to generate and submit additional instructions to access disk 14 or the like via I/O channel 16.

Also, as more processors are added, more instruction cycles tend to be dedicated to overhead because of conflicts or other interactions between processors. For example, as more processors are added, more interrupts, dispatches, conflicts resulting in spin/lock loops, I/O locking conflicts, etc. are typically encountered, all of which reduce the efficiency of the computer system. Thus, there is an interplay between the amount of memory and the processing capability of a computer system that effects how fast and efficiently the computer system can execute user queries.

Figure 2:
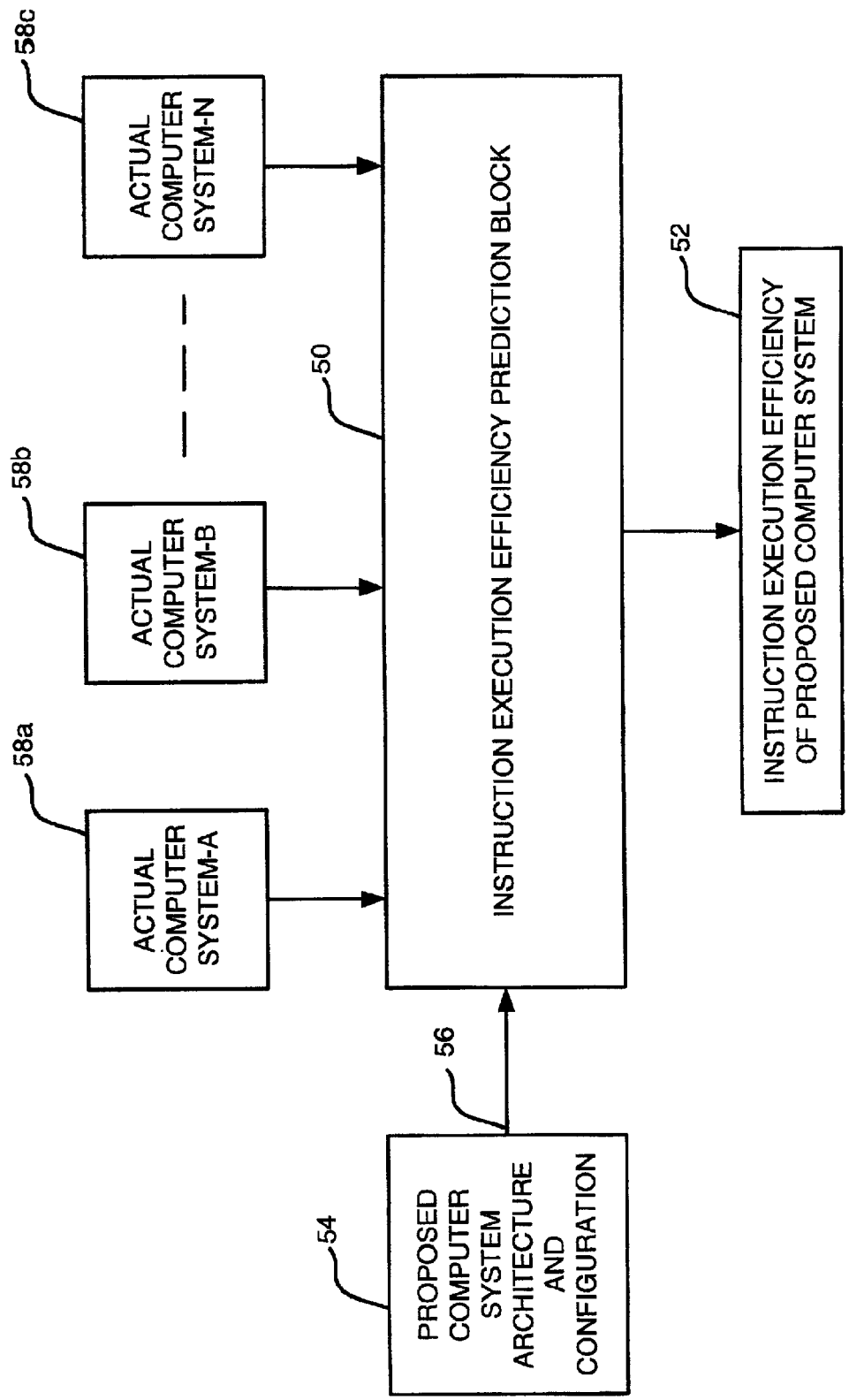
FIG. 2 is a high level block diagram of an illustrative embodiment of the present invention.

FIG. 2 is a high level block diagram showing an illustrative embodiment of the present invention. The illustrative embodiment includes an instruction execution efficiency prediction block 50 that predicts the instruction execution efficiency of a proposed computer system as shown at 52. The proposed computer system is preferably specified in a proposed computer system architecture and configuration specification 54, which is provided to the instruction execution efficiency prediction block 50 via interface 56.

To help predict the instruction execution efficiency of a proposed computer system, the instruction execution efficiency prediction block 50 preferably accepts actual measured instruction execution efficiency values from two or more actual computer systems, schematically shown at 58a–58c, each with various resource allocations such as various memory size and/or processing capability. The actual instruction execution efficiency values preferably correspond to the number of instructions that are executed per unit of work load. This may correspond to, for example, the number of instructions that are actually executed while executing a TPC benchmark.

Actual instruction execution efficiency values are preferably measured using a sufficient number of actual computer systems that have a sufficient variety of resource allocations (e.g., memory size and processing capability) to create a statistically significant pool of information or data. Using this pool of information or data, the instruction execution efficiency prediction block 50 preferably performs a multi-variant regression analysis of selected actual instruction execution efficiency values, and identifies a memory contribution or function that relates to memory size and a processing capability contribution or function that relates to processing capability. The memory contribution or function and the processing capability contribution or function can then be applied to the proposed computer system resources specified in the proposed computer system architecture and configuration specification 54 to predict the instruction execution efficiency value of the proposed computer system.

Because the instruction execution efficiency value of a computer system is typically dependent on both the size of the memory and the load on the memory, the instruction execution efficiency prediction block 50 may perform a data transformation on the memory size of each actual computer system before performing the multi-variant regression analysis. In one illustrative embodiment, the instruction execution efficiency prediction block 50 performs a data transformation that includes a memory load value divided by the memory size. The memory load value may be related to, for example, the number of transactions per minute produced by the actual computer system, the number and/or speed of the processors used in the actual computer system, or some other metric related to the processing capability of the actual computer system.

The term "memory" as used herein is meant to include any memory element or device that functions as a cache type memory. For example, the term "memory" can refer to a first-, a second-, a third-, or even an Nth-level cache memory (where N is an integer greater than 0), which in many computer architectures, is either directly or indirectly coupled to one or more processors. In addition, the term "memory" can refer to, for example, a main memory module, which in many computer architectures, functions as a cache between an Nth-level cache memory and a disk or other large storage device, as shown in FIG. 1.

Figure 3:
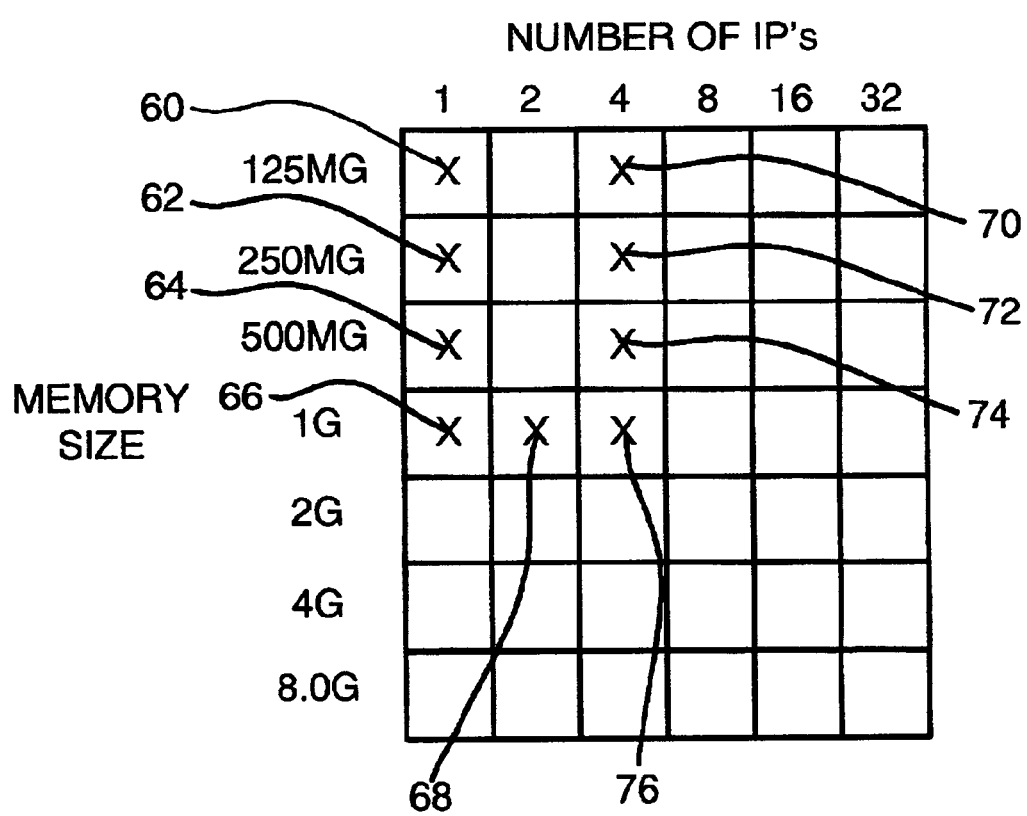
FIG. 3 is a chart showing an illustrative set of actual instruction execution efficiency values measured using actual computer systems having various memory sizes and various numbers of processors.

FIG. 3 is a chart showing an illustrative set of actual instruction execution efficiency values that are measured using several actual computer systems 58a–58c, each having a different allocation of memory size and/or number of processors. In the example shown, the actual instruction execution efficiency values, which correspond to the number of instructions that are actually executed per unit of work, are measured on four computer systems having a single processor; one with 125 MB of main memory, one with 250 MB of main memory, one with 500 MB of main memory, and one with 1 GB of main memory. These actual measured instruction execution efficiency values are shown at 60, 62, 64 and 66, respectively.

Another actual instruction execution efficiency value is measured using an actual computer system that has two processors and 1 GB of main memory, as shown at 68. Finally, actual instruction execution efficiency values are measured on four more computer systems having four processors; one with 125 MB of main memory, one with 250 MB of main memory, one with 500 MB of main memory, and one with 1 GB of main memory. These actual measured instruction execution efficiency values are shown at 70, 72, 74 and 76, respectively.

Actual instruction execution efficiency values are preferably measured using a sufficient number of actual computer systems that have a sufficient variety of resource allocations (e.g., memory size and processing capability) to create a statistically significant pool of information or data. Using this pool of information or data, the instruction execution efficiency prediction block 50 preferably predicts an instruction execution efficiency value for a proposed computer system having an allocation of resources (e.g., proposed memory size and proposed processing capability) specified in the proposed computer system architecture and configuration specification 54.

To do this, the instruction execution efficiency prediction block 50 preferably performs a multi-variant regression analysis using the actual instruction execution efficiency values in the pool of information or data. In one illustrative embodiment, the multi-variant regression analysis identifies a first contribution or function $f_1$ that corresponds to memory size and a second contribution or function $f_2$ that corresponds to processing capability. Thus, in one example, the multi-variant regression analysis may use the memory size and number of IP's as independent variables to generate an equation such as:

$$\frac{\text{Number of Instructions}}{\text{Unit of Work}} = f_1(MemorySize) + f_2(\# \text{ Processors}) \quad (1)$$

This equation can then be used by the instruction execution efficiency prediction block 50 to calculate the predicted instruction execution efficiency values for various proposed computer systems having proposed memory sizes and proposed processing capabilities, as specified in the proposed computer system architecture and configuration specification 54.

Figure 4:
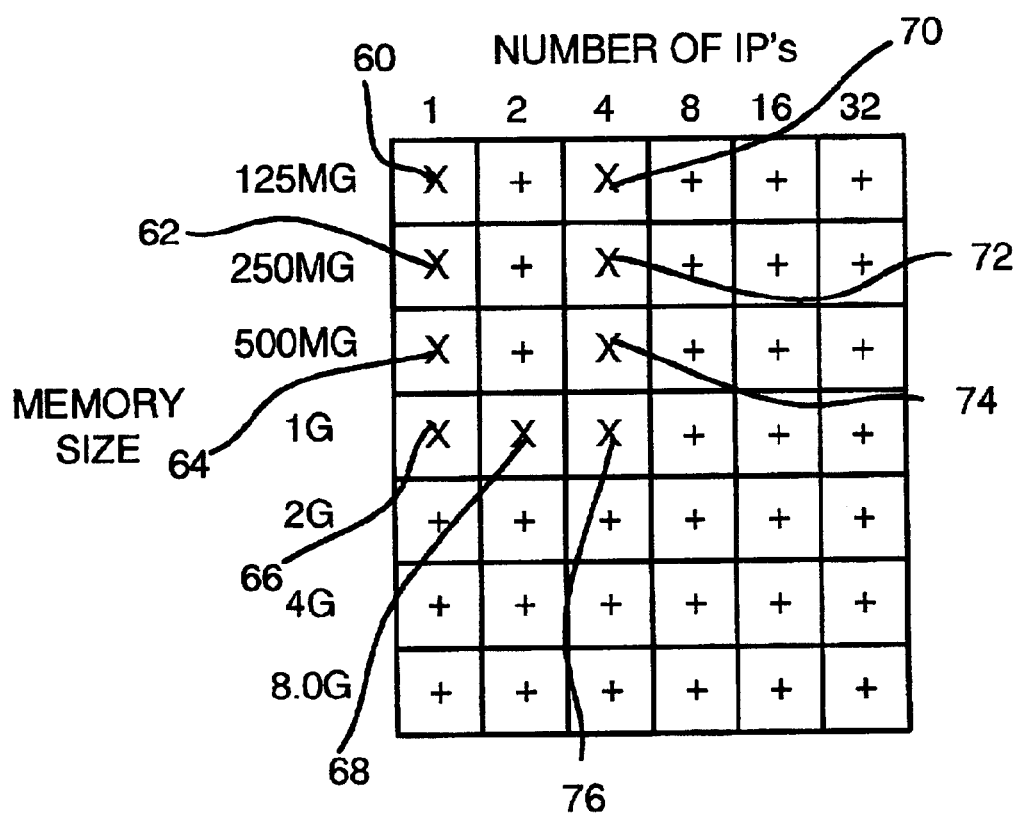
FIG. 4 is a chart showing measured (X) and projected (+) instruction execution efficiency values across various memory sizes and various numbers of processors, the projected (+) instruction execution efficiency values generated through multi-variant regression of the measured (X) instruction execution efficiency values shown in FIG. 3.

FIG. 4 is a chart showing measured (X) and projected (+) instruction execution efficiency values for various memory sizes and various numbers of processors. The measured (X) instruction execution efficiency values shown in FIG. 4 correspond to the measured (X) instruction execution efficiency values shown in FIG. 3. Using the measured (X) instruction execution efficiency values, an equation such as equation (1) is determined using a multi-variant regression analysis. The projected (+) instruction execution efficiency values of FIG. 4 are then calculated with the equation, using the proposed memory size and proposed number of IP's as independent variables. It is contemplated that all of the proposed entries (+) shown in FIG. 4 may be generated with each of the values stored in a lookup table or the like, or the values may be generated on the fly on an as needed basis.

Because the instruction execution efficiency value of a computer system is typically dependent on both the size of the memory and the load on the memory, the instruction execution efficiency prediction block 50 preferably performs a data transformation on the memory size of each actual computer system before performing the multi-variant regression analysis described above. In one illustrative embodiment, the instruction execution efficiency prediction block 50 performs a data transformation that includes a memory load value divided by the memory size. The memory load value may be related to, for example, the number of transactions per minute produced by the actual computer system, the number and/or speed of the processors used in the actual computer system, or some other metric related to the processing capability or speed of the actual computer system.

Figure 5:
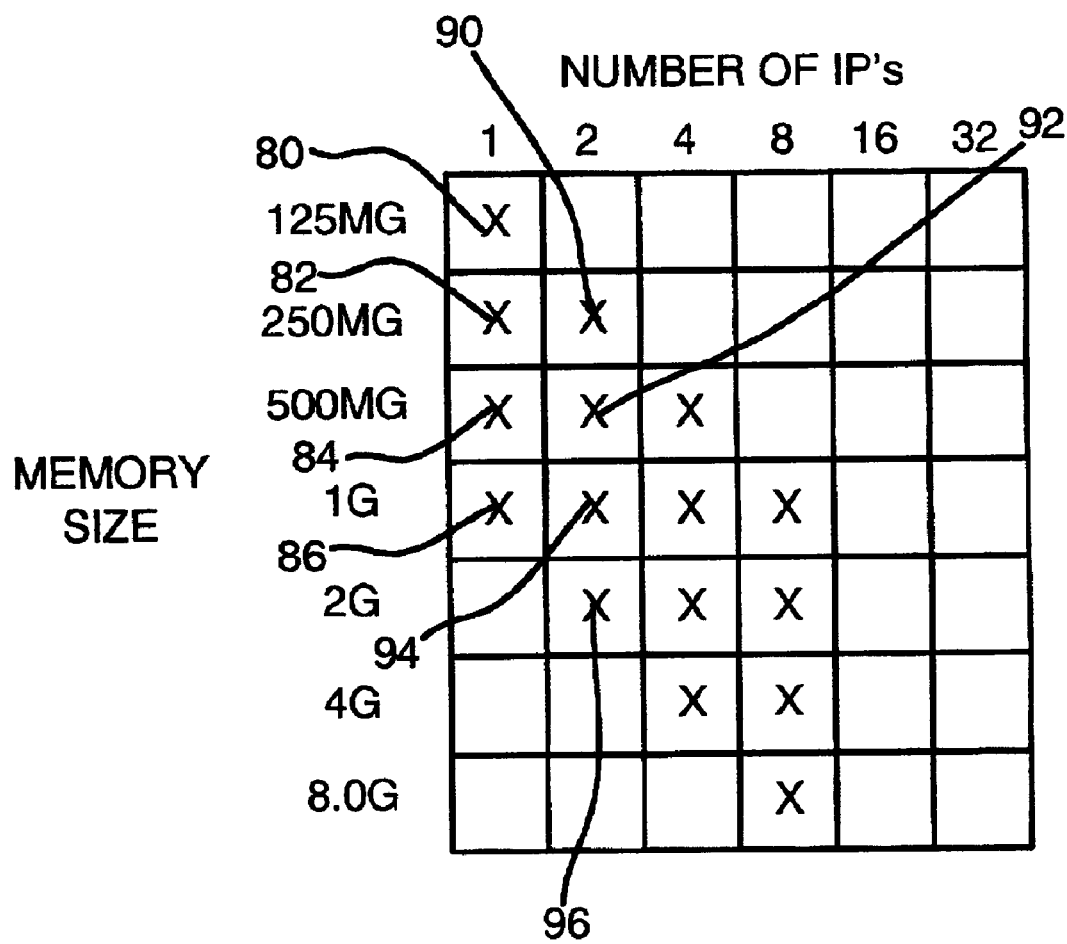
FIG. 5 is a chart showing another illustrative set of actual instruction execution efficiency values measured using actual computer systems having various memory sizes and various numbers of processors.

FIG. 5 is a chart showing an illustrative set of actual instruction execution efficiency values that may be measured when, for example, a data transformation is to be applied to the memory size of the actual computer system. In the example shown, the actual instruction execution efficiency values, which in the embodiment shown correspond to the number of instructions that are actually executed per unit of work, are measured on four computer systems having a single processor; one with 125 MB of main memory, one with 250 MB of main memory, one with 500 MB of main memory, and one with 1 GB of main memory. These actual measured instruction execution efficiency values are shown at 80, 82, 84 and 86, respectively.

Actual instruction execution efficiency values are also measured on four computer systems having two processors; one with 250 MB of main memory, one with 500 MB of main memory, one with 1 GB of main memory, and one with 2 GB of main memory. These actual measured instruction execution efficiency values are shown at 90, 92, 94 and 96, respectively. In this example, the actual computer systems that are selected to measure the actual instruction execution efficiency values for two processor systems include twice the main memory size as the actual computer systems that are selected to measure the actual instruction execution efficiency values for single processor systems. This may help, in part, to compensate for dividing a measure of the memory size by the processing capability of the actual computer system during the data transformation step as described more fully below. Despite the foregoing, it is recognized that such compensation may not be needed for the multi-variant regression analysis to identify a first contribution or function $f_1$ that corresponds to memory size and a second contribution or function $f_2$ that corresponds to processing capability. What is required is that the actual instruction execution efficiency values are measured using a sufficient number of actual computer systems that have a sufficient variety of resource allocations to create a statistically significant pool of information or data.

Referring back to FIG. 5, actual instruction execution efficiency values are also measured on four computer systems having four processors; one with 500 MB of main memory, one with 1 GB of main memory, one with 2 GB of main memory, and one with 4 GB of main memory. Finally, actual instruction execution efficiency values are also measured on four computer systems having eight processors; one with 1 GB of main memory, one with 2 GB of main memory, one with 4 GB of main memory, and one with 8 GB of main memory.

As indicated above, the number and variety of the actual instruction execution efficiency values shown in FIG. 5 preferably are sufficient to provide a statistically significant pool of information or data. Using this pool of information or data, the instruction execution efficiency prediction block 50 of FIG. 2 may predict the instruction execution efficiency values (+) for proposed computer systems having the allocation of resources (e.g., proposed memory size and proposed processing capability) shown in FIG. 6.

In this illustrative embodiment, the instruction execution efficiency prediction block 50 preferably first performs a data transformation on the memory size variable of the actual instruction execution efficiency values. The data transformation may include, for example, a memory load value divided by the memory size variable. The memory load value may be related to the number of processors in the corresponding actual system. One measure of memory load may be, for example, the number of transactions per minute (tpmC) that are provided by the corresponding actual computer system. In accordance therewith, one illustrative data transformation is shown in Table I below.

TABLE I

| Memory Size (MB) | #IP | tpmC | TpmC/MB |
|---|---|---|---|
| 420.2 | 1 | 5283 | 12.57 |
| 1613.2 | 1 | 5530.8 | 3.43 |
| 892.8 | 2 | 10147.7 | 11.37 |
| 1613.2 | 2 | 10362.1 | 6.42 |
| 1374.3 | 3 | 14604 | 10.63 |
| 1613.2 | 3 | 14625.2 | 9.07 |
| 416.8 | 4 | 10494.5 | 25.18 |
| 893.4 | 4 | 14858 | 16.63 |
| 1364.8 | 4 | 16804.5 | 12.31 |
| 1613.2 | 4 | 17644.7 | 10.94 |
| 1846.1 | 4 | 18119 | 9.81 |
| 2332.1 | 4 | 18694.8 | 8.02 |
| 2604.4 | 4 | 19441.4 | 7.46 |
| 950 | 1 | 6135.2 | 6.46 |
| 1600 | 2 | 11068.7 | 6.92 |
| 2900 | 4 | 19674.5 | 6.78 |
| 950 | 1 | 5393.8 | 5.68 |
| 1600 | 2 | 9881.7 | 6.18 |
| 2900 | 4 | 17544.3 | 6.05 |
| 2900 | 4 | 16097.5 | 5.55 |
| 2900 | 4 | 18530 | 6.39 |

After the data transformation, the instruction execution efficiency prediction block 50 may perform a multi-variant regression analysis using the output (TpmC/MB) of the data transformation as an independent variable. In this embodiment, the multi-variant regression analysis may identify a first contribution or function $f_1$ that corresponds to memory size and a second contribution or function $f_2$ that corresponds to processing capability, and may generate an equation such as:

$$\frac{\text{Number of Instructions}}{\text{Unit of Work}} = f_1\left(\frac{TPM}{MemorySize}\right) + f_2(\text{\# Processors}) \quad (2)$$

Figure 6:
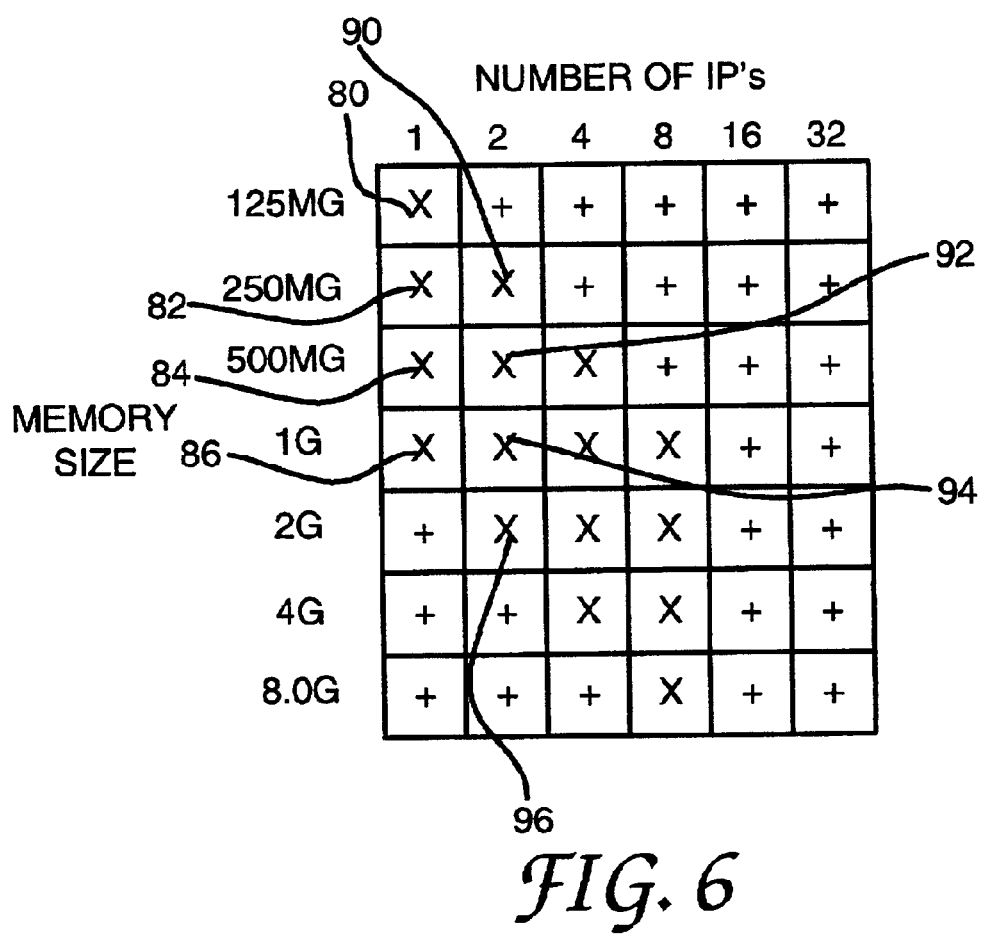
FIG. 6 is a chart showing measured (X) and projected (+) instruction execution efficiency values across various memory sizes and various numbers of processors, the projected (+) instruction execution efficiency values generated through multi-variant regression of the measured (X) instruction execution efficiency values shown in FIG. 5, subject to a data transformation function.

This equation can then be used by the instruction execution efficiency prediction block 50 to calculate the predicted (+) instruction execution efficiency values for various entries in FIG. 6. It is contemplated that all of the proposed entries (+) shown in FIG. 6 may be generated with each of the values stored in a lookup table or the like, or the values may be generated on the fly on an as needed basis.

Having thus described the preferred embodiments of the present invention, those of skill in the art will readily appreciate that the teachings found herein may be applied to yet other embodiments within the scope of the claims hereto attached.

What is claimed is:

1. A method for predicting the instruction execution efficiency of a proposed computer system configuration, the proposed computer system configuration having a number of resources including resources of a first resource type and resources of a second resource type, the method comprising:

obtaining an actual instruction execution efficiency value for each of two or more actual computer systems, wherein each actual computer system has a different allocation of resources of the first resource type and the second resource type, the actual instruction execution efficiency value for each actual computer system being measured while executing a predetermined set of software codes; and determining a predicted instruction execution efficiency value for the proposed computer system configuration using selected actual instruction execution efficiency values of the at least two actual computer systems.

2. A method according to claim 1, wherein each actual computer system has a different combination of resources of the first resource type and the second resource type.

3. A method according to claim 2, wherein the determining step includes the steps of:

performing a multi-variant regression analysis of the selected actual instruction execution efficiency values of the at least two actual computer systems to identify a first contribution or function $f_1$ for the first resource type and a second contribution or function $f_2$ for the second resource type; and applying the first contribution or function $f_1$ and the second contribution or function $f_2$ to the proposed first resource type and the second resource type, respectively, of the proposed computer system configuration to predict the predicted instruction execution efficiency value of the proposed computer system configuration.

4. A method according to claim 3, further comprising the step of performing a data transformation on the number of resources of the first resource type of the actual computer systems before performing the multi-variant regression step.

5. A method according to claim 1, wherein the resources of the first type correspond to memory.

6. A method according to claim 1, wherein the resources of the second type correspond to processing capability.

7. A method according to claim 6, wherein the processing capability relates to number of processors.

8. A method according to claim 6, wherein the processing capability relates to speed of processors.

9. A method for predicting the instruction execution efficiency of a proposed computer system configuration, the proposed computer system configuration having a proposed memory size and a proposed processing capability, the method comprising:

obtaining an actual instruction execution efficiency value for each of two or more actual computer systems, wherein each actual computer system has a selected memory size and a selected processing capability, the actual instruction execution efficiency value for each actual computer system being measured while executing a predetermined software code; and determining a predicted instruction execution efficiency value for the proposed computer system configuration using selected actual instruction execution efficiency values of the at least two actual computer systems.

10. A method according to claim 9, wherein the determining step includes the steps of:

performing a multi-variant regression analysis of the selected actual instruction execution efficiency values of the at least two actual computer systems to identify a processing capability contribution or function and a memory size contribution or function; and applying the processing capability contribution or function and the memory size contribution or function to the proposed processing capability and the proposed memory size, respectively, of the proposed computer system configuration to predict the predicted instruction execution efficiency value of the proposed computer system configuration.

11. A method according to claim 10, wherein at least two of the actual computer systems have different memory sizes, and at least two of the actual computer systems have different processing capabilities.

12. A method according to claim 10, further comprising the step of performing a data transformation on the memory size of the actual computer systems before performing the multi-variant regression step, the data transformation including a memory load value divided by the memory size.

13. A method according to claim 12, wherein the memory load value is related to the transactions per minute produced by the corresponding actual computer system.

14. A method according to claim 9, wherein each actual instruction execution efficiency value corresponds to the number of instructions that are executed per unit of work.

15. A method according to claim 9, wherein each actual instruction execution efficiency value is related to the number of instructions that are executed during execution of the predetermined software code or a portion thereof.

16. A method for predicting the instruction execution efficiency of a proposed computer system configuration, the proposed computer system configuration having a proposed memory size and a proposed processing capability, the method comprising:

obtaining an actual instruction execution efficiency value for each of two or more actual computer systems, each actual computer system having a different combination of memory size and number of processors, the actual instruction execution efficiency value determined by monitoring the number of instructions that are executed while executing a predetermined software code;

performing a multi-variant regression analysis of selected actual instruction execution efficiency values of the at least two actual computer systems to identify a processing capability contribution or function and a memory size contribution or function; and applying the processing capability contribution or function and the memory size contribution or function to the proposed processing capability and the proposed memory size, respectively, of the proposed computer system configuration to predict the predicted instruction execution efficiency value of the proposed computer system configuration.

17. A method according to claim 16, further comprising the step of performing a data transformation on the memory size of the actual computer systems before performing the multi-vaunt regression step, the data transformation including a memory load value divided by the memory size.

18. A method according to claim 17, wherein the memory load value is related to the transactions per minute produced by the corresponding actual computer system.

19. A method according to claim 16, wherein each actual instruction execution efficiency value corresponds to the number of instructions that are executed per unit of work.

20. A method according to claim 16, wherein each actual instruction execution efficiency value is related to the number of instructions that are executed during execution of the predetermined software code or a portion thereof.

* * * * *

UNITED STATES PATENT AND TRADEMARK OFFICE
CERTIFICATE OF CORRECTION

PATENT NO. : 6,807,522 B1
DATED : October 19, 2004
INVENTOR(S) : Marwan A. Orfali It is certified that error appears in the above-identified patent and that said Letters Patent is hereby corrected as shown below:

Column 12,
Line 54, the term "multi-vaunt" should read -- multi-variant --.

Signed and Sealed this

First Day of February, 2005

JON W. DUDAS
*Director of the United States Patent and Trademark Office*